(No Model.)

J. C. RANDAL & W. E. PRICE.
MULTIPLYING CAMERA.

No. 465,802. Patented Dec. 22, 1891.

Attest
J. Holhaaf
U. M. White

Inventors
John C. Randal
William E. Price
by Carl Spengel Atty

UNITED STATES PATENT OFFICE.

JOHN C. RANDAL AND WILLIAM E. PRICE, OF CINCINNATI, OHIO.

MULTIPLYING-CAMERA.

SPECIFICATION forming part of Letters Patent No. 465,802, dated December 22, 1891.

Application filed August 12, 1891. Serial No. 402,471. (No model.)

*To all whom it may concern:*

Be it known that we, JOHN C. RANDAL and WILLIAM E. PRICE, both citizens of the United States, residing at Cincinnati, in the county of Hamilton and State of Ohio, have invented certain new and useful Improvements in Multiplying-Cameras; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in multiplying-cameras for photographic use and of the kind where with a certain number of lenses a larger amount of pictures may be taken on the same plate. Thus, for instance, in a camera with nine lenses by moving the plate after the first exposure, so as to bring its unexposed portions lying between the first exposed parts opposite the lenses and within their range, the number of pictures obtainable may be doubled, tripled, or quadrupled, according to the special requirements of the occasion. This method of taking a number of pictures on one plate by moving the latter is not supposed to be new; but the particular means and special construction which we employ to do it are considered to constitute our invention; and our object is to provide a construction which is practical and cheap and of such a character as to be easily applicable to existing styles of cameras, especially such which have already a horizontal movement, but not a vertical one. By applying our improvement to this latter class of cameras their capacity is doubled, and a considerable amount of prepared plate between the horizontal rows of the exposures may be used now which otherwise had to go to waste. While in some cameras the horizontal change of the plate is attained by moving the plate-holder and the vertical change by the movement of a carriage which carries the plate-holder, we accomplish this vertical movement by the adjustment of the back of the camera, which is made movable and which carries with it a horizontally-moving carriage and the plate-holder, thereby leaving these parts undisturbed after once adjusted. The specific construction whereby all these effects are attained is more fully described in the following specification, and illustrated in the accompanying drawings, in which—

Figure 1:
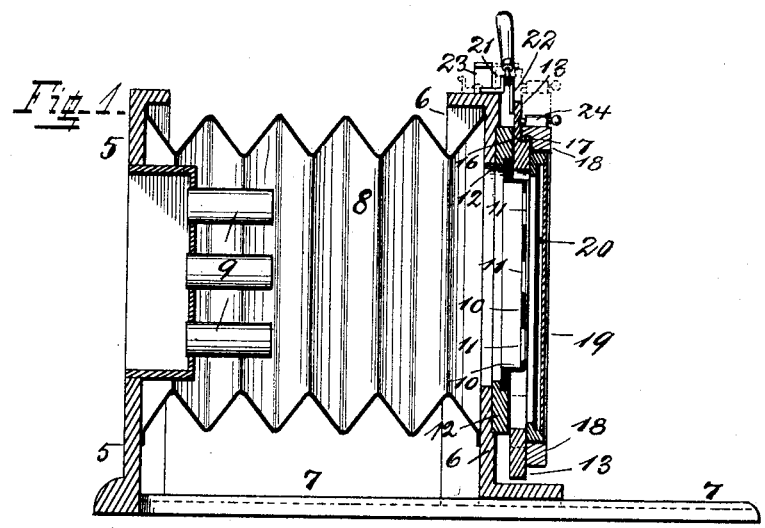
Figure 2:
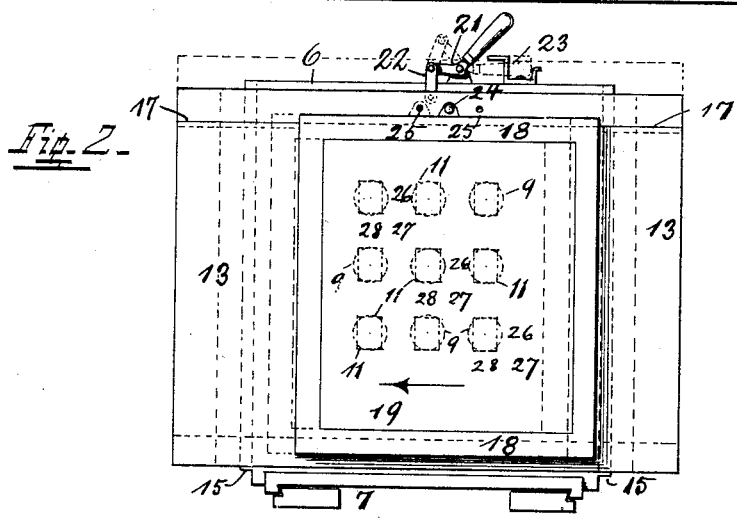
Figure 3:
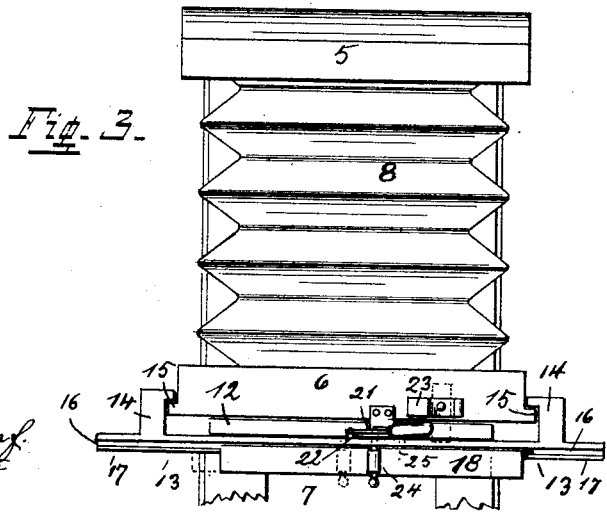

Figure 1 is a central vertical section through a camera embodying our improvements. Fig. 2 is a rear, and Fig. 3 a top, view of the same.

5 is the stationary front frame, 6 the sliding back frame, 7 the base, 8 the bellows, and 9 a group of lenses, all constructed and arranged as ordinarily found in cameras of customary pattern.

10 is a diaphragm provided with a number of openings 11, which are opposite the lenses and of a size to correspond with the required area of the exposure. This diaphragm is immovably held in a frame 12, which latter is rigidly secured to the back frame of the camera.

13 is the vertically-adjustable back, provided with slides 14 14 on each side of it, which engage with guides 15 15, secured to the sides of the back frame, and thus hold the back in position against the camera. Near its top the back is provided with a groove 16 and a feather 17, in which the correspondingly-formed upper rail of a horizontally-moving frame or carriage 18 engages. This frame or carriage holds a suitable plate-holder 19, of ordinary construction, which latter in turn holds the prepared plate 20. Back 13 is connected to a lever 21 by means of a link 22, by which it is raised and lowered. It is held up in its raised position by a catch 23, which is turned over the lever after the same has been depressed. The horizontally-sliding carriage 18 is held in position on the back by means of a spring-catch 24, engaging with sockets 25, located in proper position on the back.

The operation of this improved camera is as follows: After the first exposure has been made carriage 18 is moved in the direction of the arrow, so as to bring portions 26, Fig. 2, of the plate within the range of the lenses. The frame is secured and held in position in one of the sockets 25, after which a second exposure is made, which, with the first one, produces eighteen pictures. The adjustable back, which carries the frame 18, is next raised by means of a lever 21, so as to bring parts 27 of the plate within the range of the lenses. Back 13 is secured and held in position by catch 23, which engages with lever 21, and a third exposure is had, which produces twenty-seven pictures. With the back in such raised position carriage 18 is now moved to the right and back again to its original position, bringing parts 28 of the plate (located below the first picture taken) within the focus of the lenses. A fourth exposure may now be made, which increases the number of pictures on this same plate to thirty-six.

As will be observed, all parts of the prepared plate between the first exposure are utilized and thirty-six pictures are had with nine lenses. This is all done without touching or moving the plate-holder, and the same remains undisturbed in its adjusted position.

No specially-prepared plate-holder is needed and any one of the well-known styles may be used.

As all the principal elements are carried by the movable back, any one of the existing styles of cameras may be easily converted by simply providing it with an adjustable back and attaching the necessary parts thereto.

Having described our invention, we claim as new—

1. In a multiplying-camera, the combination, with the back frame thereof, provided with guides 15 15 and catch 23, of a movable back adapted and arranged to carry a plate-holder and provided with the slides 14 14, and an operating-lever 21, and connecting-link 22, which connects back and lever, all as substantially shown and described.

2. In a multiplying-camera, the combination, with the back frame provided with guides 15 15 and catch 23 and having secured to it the intermediate stationary frame 12, which carries the diaphragm, of a movable back adapted and arranged to carry a plate-holder and provided with the slides 14 14, operating-lever 21, and connecting-link 22, which connects back and lever, all as substantially shown and described.

3. In a multiplying-camera, the combination, with the back frame thereof, provided with guides 15 15 and catch 23, of a movable back arranged and adapted to carry and having the horizontally-moving frame or carriage 18, with the plate-holder having slides 14 14, an operating-lever 21, and a link 22, which connects the latter to the back, both the movable back and the carriage 18 being provided with means to adjust them and lock them in their adjusted positions on each other and on the back frame, all as substantially shown and described.

4. In a multiplying-camera, the combination, with its back frame, which has secured to it the intermediate stationary frame 12, with a diaphragm, and is provided with guides 15 15 and catch 23, of a movable back arranged and adapted to carry and having the horizontally-adjustable carriage 18, with the plate-holder and with means to lock it in its adjusted positions, the back further having slides 14 14, an operating-lever 21, and a link 22, which connects the latter to the back, all as substantially shown and described.

In testimony whereof we affix our signatures in presence of two witnesses.

JOHN C. RANDAL.
WILLIAM E. PRICE.

Witnesses:
CARL SPENGEL,
C. E. PRIOR.